April 6, 1965  R. M. CROOKER  3,177,486
THREE-DIMENSIONAL DISPLAY

Filed Nov. 13, 1961  2 Sheets-Sheet 2

United States Patent Office 3,177,486
Patented Apr. 6, 1965

3,177,486
THREE-DIMENSIONAL DISPLAY
Robert M. Crooker, Cold Spring Harbor, N.Y., assignor to Hazeltine Research, Inc., a corporation of Illinois
Filed Nov. 13, 1961, Ser. No. 151,737
10 Claims. (Cl. 343—7.9)

General

This invention relates to a three-dimensional display particularly suited to exhibit information developed by a radar system. The invention may be employed to show the air traffic situation in the vicinity of an airport. Another application is in contour mapping the terrain over which an airplane is flying.

At the present time, air traffic in the vicinity of airports is visually exhibited on two-dimensional displays such as the well-known plan position indicators. A three-dimensional display such as one constructed in accordance with the present invention would provide viewers with a more realistic indication of the actual traffic situation around the airport. Thus, a three-dimensional display would warn an airport observer about possible mid-air collisions in a quicker and more efficient manner than presently used indicating devices. In addition, an improved display device such as a three-dimensional display would permit increasing the air traffic handling capability of an airport.

In accordance with the present invention a three-dimensional display comprises a plurality of two-dimensional matrices stacked in a third dimension. Each matrix comprises a crossed conductor configuration and visual indicating elements at the intersections of these conductors. The three-dimensional display additionally includes means for sequentially energizing selected pairs of conductors of any matrix with time-shared signals, thereby energizing the visual indicating elements located at the intersections of the aforementioned selected pairs of conductors and preventing energizing of visual indicating elements located at the intersections of one conductor of one pair and another conductor of another pair.

For a better understanding of the present invention, together with other and further objects thereof, reference is had to the following description taken in connection with the accompanying drawings, and its scope will be pointed out in the appended claims.

Referring to the drawings.

Description and operation of the three-dimensional display

Figure 1:
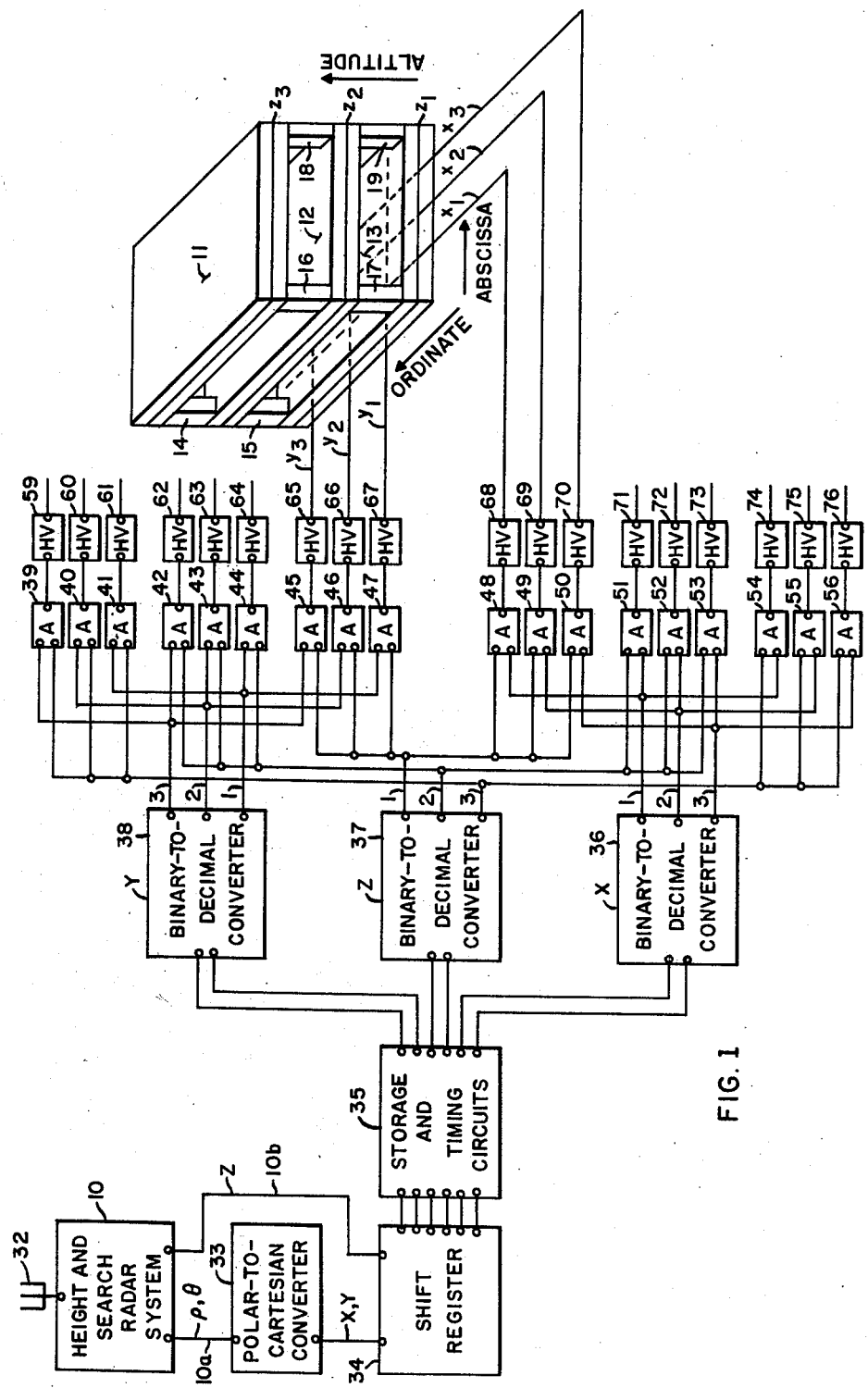
FIG. 1 shows a three-dimensional display constructed in accordance with the present invention employed to display targets detected by a height and search radar system.

The three-dimensional display constructed in accordance with the present invention will be described as being employed to display targets detected by a height and search radar system. Referring to FIG. 1, a three-dimensional display comprises a plurality of two-dimensional matrices 11, 12 and 13 stacked in a third dimension. As shown in the drawing, the matrices have their two dimensions in a horizontal plane and are stacked vertically, being spaced in the vertical dimension by a plurality of spacers 14–19, inclusive.

Figure 2:
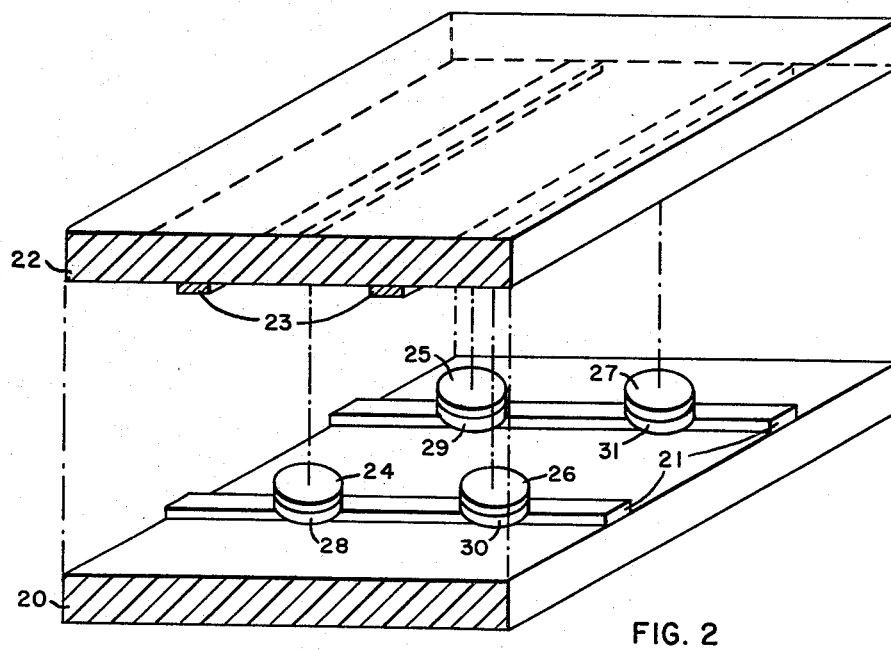
FIG. 2 shows a detailed drawing of a portion of a matrix in a three-dimensional display constructed in accordance with the present invention.

Each matrix 11, 12 and 13 comprises a crossed conductor configuration and light emitting elements at the intersections of the conductors. Referring to FIG. 2 where a portion of a matrix is shown in detail, each matrix may specifically comprise a first transparent sheet 20 having a first set of parallel conductors 21 printed thereon and a second transparent sheet 22 having a second set of parallel conductors 23 printed thereon. The transparent sheets 20 and 22 may be of glass or any other nonconductive material capable of passing light at a relatively high efficiency. Conductors 21 and 23 may be deposited on transparent sheets 20 and 22, respectively, by conventional printed wiring techniques. While the thickness of conductors 21 and 23 has been exaggerated in FIG. 2 merely for purposes of illustration, in practice their thickness would be kept extremely thin. The width of the conductors would also be kept to a minimum so that when a plurality of matrices are stacked, the conductors would not appreciably obstruct the passage of light from within the display to the surface.

The position and direction of conductors 23 are such that when transparent sheets 20 and 22 are mated, conductors 21 and 23 intersect. As shown in the drawing, the second set of conductors 23 is at right angles to the first set 21 thus forming a crossed conductor grid configuration when transparent sheets 20 and 22 are mated.

Each matrix 11, 12 and 13 additionally comprises light emitting elements 24–27, inclusive, shown as discs placed between transparent sheets 20 and 22 at the intersections of the conductors. Light emitting elements 24–72, inclusive, may be electroluminescent phosphor cells or any other elements capable of emitting a sufficient amount of light which may be viewed at the surface of the display when these elements are energized by electrical signals. Associated with the electroluminescent phosphor cells are high dielectric ceramic discs 28–31, inclusive. These ceramic discs increase the breakdown point when electrical signals are applied across the electroluminescent phosphor cells. Again, the size of the electroluminescent phosphor cells and the high dielectric ceramic discs is kept to a minimum so as not to appreciably obstruct the light being transmitted through the display. On the other hand, the electroluminescent phosphor cells must be made large enough to provide a sufficient amount of light.

The plurality of vertically stacked two-dimensional matrices 11, 12 and 13 may be representative of a volume in space scanned by the height and search radar system 10 and each individual matrix may be representative of an altitude level in this volume in space. The first set of conductors of each matrix corresponding to conductors 21 of FIG. 2 may be representative of ordinate coordinates and the second set of conductors of each matrix corresponding to conductors 23 of FIG. 2 may be representative of abscissa coordinates. As shown in FIG. 1, the abscissa, ordinate and altitude axes have been designated as X, Y and Z, respectively. The numerals 1, 2 and 3 adjacent to conductors of matrix 13 represent abscissa and ordinate conductors.

The three-dimensional display constructed in accordance with the present invention additionally includes means for energizing selected conductors thereby illuminating the light emitting element located at the intersection of the selected conductors. The height and search radar system 10 in response to signals received by its antenna 32 develops and supplies in a conventional manner electrical signals representative of the altitude and polar coordinates of targets. The polar coordinate signals, designated ($\rho$, $\theta$), are supplied along a line 10a to a polar-to-Cartesian converter 33 which develops planar coordinate signals, designated (X, Y), of the targets. The polar-to-Cartesian converter 33 may be of conventional construction similar to presently available commercial models. The altitude coordinate signals, designated (Z), are supplied along a line 10b. Signals (X), (Y) and (Z) thus are representative of the Cartesian coordinates of targets detected by the height and search radar system 10. These signals are preferably supplied in binary coded form for the particular processing circuitry which is to be described hereinafter. Since the three-dimensional display as shown in FIG. 1 has only three altitude levels and three ordinate and three abscissa conductors, two binary bits are sufficient to describe each coordinate of the target. For a larger display, for example one having more altitude levels and abscissa or ordinate conductors, the number of binary bits must be increased.

The arrangement shown in FIG. 1 for energizing selected conductors of the display is such that the altitude coordinate signal (Z) selects matrices corresponding to the altitudes of the targets while the planar coordinate signals (X) and (Y) select pairs of ordinate and abscissa conductors within selected matrices corresponding to the planar coordinates of the targets. In particular, the (X), (Y) and (Z) signals are supplied to a shift register 34 of conventional construction and operation which supplies these binary coded signals in parallel to storage and timing circuits 35. Six lines are shown between the shift register 34 and the storage and timing circuits 35 to carry the three coordinate signals each having two binary bits. The storage and timing circuits 35 store the target locations and when subsequently read, furnish the same information. The function and operaiton of the storage and timing circuits 35 will be explained in more detail hereinafter. At this point it will be sufficient to assume that the storage and timing circuits 35 supply when required binary coded signals representative of the target locations.

Three binary-to-decimal converters 36, 37 and 38 all of conventional construction and operation are connected to the output of the storage and timing circuits 35. Whenever information previously stored is derived or read by the storage and timing circuits 35, the stored binary coded signals are individually converted to decimal signals by the appropriate binary-to-decimal converter. Each binary-to-decimal converter has been designated as developing that coordinate in decimal form shown directly above it. Each binary-to-decimal converter is shown to have two input lines corresponding to the two binary bits which describe the respective coordinate of the target. Again, for a larger display more lines would be connected between the storage and timing circuits 35 and the binary-to-decimal converters 36, 37 and 38.

The binary-to-decimal converters develop electrical signals at any one of their three outputs in response to the two-bit binary coded input signal. Numerals 1, 2 and 3 have been shown immediately above the output lines of each binary-to-decimal converter to indicate that line which carries a signal in response to a corresponding binary coded signal at its input. For example, if the Cartesian coordinates (X), (Y) and (Z) are $x_1$, $y_3$ and $z_1$ the top line 1 of the (X) converter, the top line 3 of the (Y) converter and the top line 1 of the (Z) converter carry electrical signals. Once again, for a larger display additional output lines would be needed for the binary-to-decimal converters.

Connected to the outputs of the binary-to-decimal converters 36, 37 and 38 are a plurality of AND circuits 39–56, inclusive, all of conventional construction and operation. Connected to the outputs of the AND circuits 39–56, inclusive, are a plurality of high voltage circuits 59–76, inclusive. The high voltage circuits 59–76, inclusive, are in turn connected to the conductors which make up the crossed conductor grid configurations of the plurality of two-dimensional matrices 11, 12 and 13. For the sake of clarity only the connections between the high voltage circuits 65–70, inclusive, to the conductors of the matrix 13 have been shown. The high voltage circuits 59, 60 and 61 would be connected to ordinate conductors in matrix 11 and the high voltage circuits 62, 63 and 64 would be connected to ordinate conductors in the matrix 12 in the same manner that high voltage circuits 65, 66 and 67 are connected to the ordinate conductors in matrix 13. The high voltage circuits 74, 75 and 76 would be connected to the abscissa conductors of matrix 11 and the high voltage circuits 71, 72 and 73 would be connected to the abscissa conductors of the matrix 12 in the same manner that the high voltage circuits 68, 69 and 70 are connected to the abscissa conductors of the matrix 13. The high voltage circuits connected to the abscissa conductors supply electrical signals of one polarity equal to half the voltage required to excite the electroluminescent phosphor cells while the high voltage circuits connected to the ordinate conductors supply electrical signals of opposite polarity also equal to half the voltage required to excite the electroluminescent phosphor cells.

The AND circuits 39–56, inclusive, operating in a conventional manner develop potential changes in their output levels whenever input signals appear at both their input terminals. Such potential changes in the output levels trigger the high voltage circuit associated with that AND circuit and thus a high voltage is supplied to the conductor connected to that high voltage circuit.

As previously mentioned, the altitude coordinate signals (Z) select the matrix corresponding to the altitude of the target. This is accomplished by the manner in which the binary-to-decimal converter 37 is connected to AND circuits 39–56, inclusive. For the example given above, namely the coordinates $x_1$, $y_3$, $z_1$ only the AND circuits 45, 46, 47, 48, 49 and 50 which are connected to output line 1 of the (Z) converter are capable of triggering their associated high voltage circuits. This means that only the conductors of matrix 13 corresponding to an altitude coordinate $z_1$ can be energized. As previously mentioned, the particular conductors in the selected matrix 13 which are energized are selected by the planar coordinate signals (X) and (Y). The binary-to-decimal converters 36 and 38 for (X) and (Y) coordinates $x_1$, $y_3$ respectively, supply signals to AND circuit 48, 51 and 54 and 39, 42 and 45. Thus, for coordinates $x_1$, $y_3$, $z_1$, AND circuits 45 and 48 are the only AND circuits which have input signals at both input terminals. Therefore, only high voltage circuits 65 and 68 associated with AND circuits 45 and 48, respectively, supply high voltages to the conductors to which they are connected. High voltage circuit 68 is connected to that abscissa coordinate conductor corresponding to an abscissa coordinate $x_1$ in matrix 13 and high voltage circuit 65 is connected to the ordinate coordinate conductor corresponding to an ordinate coordinate $y_3$ in matrix 13. The electro-luminscent phosphor cell located at the intersection of these two conductors in matrix 13 is thereby illuminated due to the high voltages which energize the conductors which intersect at this cell.

Figure 3:
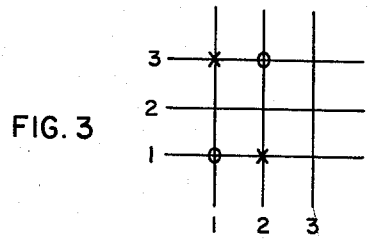
FIG. 3 shows a crossed conductor grid configuration.
Figure 4:
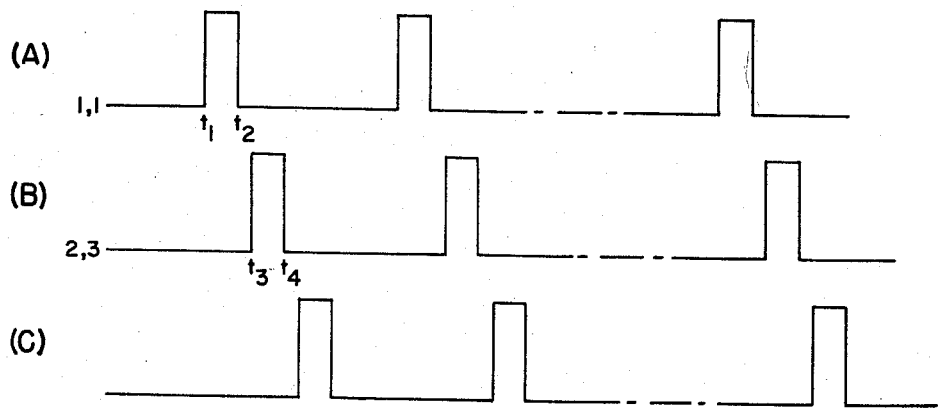
FIG. 4 shows waveforms of electrical signals which may be used to energize the matrices of the FIG. 1 three-dimensional display.

The foregoing description has set forth the manner in which a single target is exhibited by a three-dimensional display constructed in accordance with the present invention. This three-dimensional display is, however, capable of exhibiting a plurality of targets even if more than one target is at the same altitude level. Referring to FIG. 3 there is shown a crossed conductor grid configuration which may represent one altitude level. If actual targets exist at coordinates 1, 1 and 2, 3, indicated by circles at the intersections, conductor pairs 1, 1 and 2, 3 would have to be energized. If these conductors are energized simultaneously, the electroluminescent phosphor cells located at the intersections of conductors 2, 1 and 1, 3 will also become illuminated when in fact no targets exist at these coordinates. It is thus apparent that no more than one conductor pair can be energized at one time. If the conductor pairs are energized with single, short duration pulses, the target locations will be displayed for only a short amount of time. This is due to the fact that the electroluminescent phosphor cells do not possess the property of long persistence. The problems of ambiguity and persistence may be overcome by energizing the conductor pairs sequentially with repetitive time shared signals. Referring to FIG. 4, conductor pair 1, 1 of FIG. 3 may be energized by its associated high voltage circuits triggered by waveform (A) during period $t_1$–$t_2$ and conductor pair 2, 3 may be energized by its associated high voltage circuits triggered by waveform (B) during period $t_3$–$t_4$. Waveform (C) has also been shown and may be used for a third target. Each conductor pair is repetitively energized by these waveforms during one radar scan period. By the time the radar makes one complete scan new signals are received at the antenna 32 and in the case of a moving target new coordinates would be illuminated. The frequency and duration of these energizing pulses is dependent upon the limitations of the electroluminescent phosphor cells and would be further selected on the basis of the number of targets that might be simultaneously displayed in any altitude level. The time during which the pulse trains continue is set to coincide with the rate of scan of the radar. By energizing the conductor pairs with repetitive time shared signals, the electroluminescent phosphor cells located at the intersections of selected conductors, representative of the locations of targets, are illuminated while those electroluminescent phosphor cells located at the intersections of one conductor of one pair and another conductor of another pair are not illuminated. Furthermore, due to the fact that only one-half of the required excitation voltage appears on any one conductor, lighting of unselected target locations on that conductor due to stray capacity ground return paths will not occur.

The storage and timing circuits 35 derive the time shared signals such as the ones shown in FIG. 4. The construction and operation of the storage and timing circuits 35 are essentially the same as that used in digital computer techniques. In particular, the storage may be an ordinary memory drum or a memory matrix. The binary coded signals supplied in parallel from the shift register 35 are steered to particular storage locations by the timing circuits and are stored in these locations until the memory is read. The timing circuits then function to read the storage in a sequential or other predetermined manner and write the same information back in. The particular information derived or read out of the particular locations within the storage appears at the output terminals of the storage and timing circuits 35. From this point on the operation is the same as that previously described. The binary-to-decimal converters, the AND circuits and the high voltage circuits perform their prescribed functions for each target location as it is sequentially read out of the storage.

It is well-known that when light leaves a medium of low refractive index and enters one of high refractive index, there is a loss due to reflection at the surface. Such a loss may occur when the space between the plurality of matrices 11, 12 and 13 is occupied by air. Any light which has to go through a substantial number of matrices may result in high loss, thus cutting down its effect at the surface of the display. This shortcoming may be overcome by replacing the air between the matrices with mineral oil or other transparent substances having a refractive index substantially the same as the refractive index of the transparent sheets which make up the matrices.

While there has been described what at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A three-dimensional display comprising:
a plurality of two-dimensional matrices stacked in a third dimension, each matrix comprising a crossed conductor configuration and visual indicating elements at the intersections of said conductors;
and means for sequentially energizing selected pairs of conductors of any matrix with time shared signals, thereby energizing the visual indicating elements located at the intersections of said selected pairs of conductors and preventing energizing of visual indicating elements located at the intersections of one conductor of one pair and another conductor of another pair.

2. A three-dimensional display comprising:
a plurality of two-dimensional matrices stacked in a third dimension, each matrix comprising a crossed conductor configuration and light emitting elements at the intersections of said conductors;
and means for sequentially energizing selected pairs of conductors of any matrix with time shared signals, thereby illuminating the light emitting elements located at the intersections of said selected pairs of conductors and preventing illumination of light emitting elements located at the intersections of one conductor of one pair and another conductor of another pair.

3. A three-dimensional display comprising:
a plurality of two-dimensional matrices stacked in a third dimension, each matrix comprising a first transparent sheet having a first set of parallel conductors printed thereon, a second transparent sheet having a second set of parallel conductors printed thereon which intersect said first set and light emitting elements at the intersections of said conductors;
and means for sequentially energizing selected pairs of conductors of any matrix with time shared signals, thereby energizing the visual indicating elements located at the intersections of said selected pairs of conductors and preventing energizing of visual indicating elements located at the intersections of one conductor of one pair and another conductor of another pair.

4. A three-dimensional display comprising:
a plurality of two-dimensional matrices stacked in a third dimension, each matrix comprising a first transparent sheet having a first set of parallel conductors printed thereon, a second transparent sheet having a second set of parallel conductors printed thereon at right angles to said first set and light emitting elements placed between said sheets at the intersections of said conductors;
and means for sequentially energizing selected pairs of conductors of any matrix with time shared signals, thereby illuminating the light emitting elements located at the intersections of said selected pairs of conductors and preventing illumination of light emitting elements located at the intersections of one conductor of one pair and another conductor of another pair.

5. A three-dimensional display comprising:
a plurality of two-dimensional matrices stacked in a third dimension, each matrix comprising a first transparent sheet having a first set of parallel conductors printed thereon and a second transparent sheet having a second set of parallel conductors printed thereon at right angles to said first set to form a crossed conductor grid configuration, and electroluminescent phosphor cells placed between said sheets at the intersections of said conductors;
and means for sequentially energizing selected pairs of conductors of any matrix with time shared signals, thereby illuminating the electroluminescent phosphor cells located at the intersections of said selected pairs of conductors and preventing illumination of electroluminescent phosphor cells located at the intersections of one conductor of one pair and another conductor of another pair.

6. A three-dimensional display comprising:
a plurality of two-dimensional matrices stacked in a third dimension, each matrix comprising a first transparent sheet having a first set of parallel conductors printed thereon and a second transparent sheet having a second set of parallel conductors printed thereon at right angles to said first set to form a crossed conductor grid configuration, and electroluminescent phosphor cells placed between said sheets at the intersections of said conductors;
means for selecting matrices from said plurality of matrices;
and means for sequentially energizing selected pairs of conductors of any selected matrix with time shared signals, thereby illuminating the electroluminescent phosphor cells located at the intersections of said selected pairs of conductors and preventing illumination of electroluminescent phosphor cells located at the intersections of one conductor of one pair and another conductor of another pair.

7. A three-dimensional display for a radar system comprising:
a plurality of vertically stacked two-dimensional matrices representative of a volume in space scanned by said radar system, each matrix representative of an altitude level in said volume in space and comprising a first transparent sheet having a first set of parallel conductors printed thereon representative of ordinate coordinates and a second transparent sheet having a second set of parallel conductors printed thereon representative of abscissa coordinates to form a crossed conductor grid configuration, and electroluminescent phosphor cells placed between said sheets at the intersections of said conductors;
means for developing electrical signals representative of the altitude and planar coordinates of targets in said volume in space;
means responsive to said altitude coordinate signals for selecting matrices corresponding to the altitudes of said targets;
and means responsive to said planar coordinate signals for sequentially energizing selected pairs of ordinate and abscissa conductors of any selected matrix with time shared signals, thereby illuminating the electroluminescent phosphor cells located at the intersections of said selected pairs of conductors and representative of the locations of said targets and preventing illumination of electroluminescent phosphor cells located at the intersections of one conductor of one pair and another conductor of another pair.

8. A three-dimensional display for a height and search radar system comprising:
a plurality of vertically stacked two-dimensional matrices representative of a volume in space scanned by said radar system, each matrix representative of an altitude level in said volume in space and comprising a first transparent sheet having a first set of parallel conductors printed thereon representative of ordinate coordinates and a second transparent sheet having a second set of parallel conductors printed thereon representative of abscissa coordinates to form a crossed conductor grid configuration, and electroluminescent phosphor cells placed between said sheets at the intersections of said conductors;
means for developing electrical signals representative of the altitude coordinates of targets in said volume in space;
means for supplying electrical signals representative of the polar coordinates of said targets;
means responsive to said polar coordinate signals for developing electrical signals representative of the planar coordinates of said targets;
storage means for storing said altitude and planar coordinate signals;
means for repetitively deriving said stored altitude and planar signals in a sequential manner for one radar scan period;
means responsive to said repetitive altitude coordinate signals for selecting matrices corresponding to the altitudes of said targets;
and means responsive to said repetitive planar coordinate signals for sequentially energizing selected pairs of ordinate and abscissa conductors of any selected matrix with time shared signals, thereby illuminating the electroluminescent phosphor cells located at the intersections of said selected pairs of conductors and representative of locations of said targets and preventing illumination of electroluminescent phosphor cells located at the intersections of one conductor of one pair and another conductor of another pair.

9. A three-dimensional display for a height and search radar system comprising:
a plurality of vertically stacked two-dimensional matrices representative of a volume in space scanned by said radar system, each matrix representative of an altitude level in said volume in space and comprising a first transparent sheet having a first set of parallel conductors printed thereon representative of ordinate coordinates and a second transparent sheet having a second set of parallel conductors printed thereon representative of abscissa coordinates to form a crossed conductor grid configuration, and electroluminescent phosphor cells placed between said sheets at the intersections of said conductors;
means for developing binary coded electrical signals representative of the altitude coordinates of targets in said volume in space;
means for supplying electrical signals representative of of the polar coordinates of said targets;
means responsive to said polar coordinate signals for developing binary coded electrical signals representative of the planar coordinates of said target;
storage means for storing said binary coded altitude and planar coordinate signals;
means for repetitively deriving said stored altitude and planar signals in a sequential manner for one radar scan period;
means for repetitively converting said derived signals to decimal signals representative of said planar and altitude coordinates;
means responsive to said repetitive decimal altitude coordinate signals for selecting matrices corresponding to the altitudes of said targets;
and means responsive to said repetitive decimal planar coordinate signals for sequentially energizing selected pairs of ordinate and abscissa conductors of any selected matrix with time shared signals, thereby illuminating the electroluminescent phosphor cells located at the intersections of said selected pairs of conductors and representative of locations of said targets and preventing illumination of electroluminescent phosphor cells located at the intersections of one conductor of one pair and another conductor of another pair.

10. A three-dimensional display for a height and search radar system comprising:
a plurality of vertically stacked two-dimensional matrices representative of a volume in space scanned by said radar system, each matrix representative of an altitude level in said volume in space and comprising a first transparent sheet having a first set of parallel conductors printed thereon representative of ordinate coordinates and a second transparent sheet having a second set of parallel conductors printed thereon representative of abscissa coordinates to form a crossed conductor grid configuration, and electroluminescent phosphor cells placed between said sheets at the intersections of said conductors;

a substance having substantially the same refractive index as the refractive index of said transparent sheets placed between said plurality of matrices;

means for developing binary coded electrical signals representative of the altitude coordinates of targets in said volume in space;

means for supplying electrical signals representative of the polar coordinates of said targets;

means responsive to said polar coordinate signals for developing binary coded electrical signals representative of the planar coordinates of said targets;

storage means for storing said binary coded altitude and planar coordinate signals;

means for repetitively deriving said stored altitude and planar signals in a sequential manner for one radar scan period;

means for repetitively converting said derived signals to decimal signals representative of said planar and altitude coordinates;

means responsive to said repetitive decimal altitude coordinate signals for selecting matrices corresponding to the altitudes of said targets;

and means responsive to said repetitive decimal planar coordinate signals for sequentially energizing selected pairs of ordinate and abscissa conductors of any selected matrix with time shared signals, thereby illuminating the electroluminescent phosphor cells located at the intersections of said selected pairs of conductors and representative of locations of said targets and preventing illumination of electroluminescent phosphor cells located at the intersections of one conductor of one pair and another conductor of another pair.

References Cited by the Examiner
UNITED STATES PATENTS

| | | | |
|---|---|---|---|
| 2,762,031 | 9/56 | Fryklund | 343—7.9 |
| 2,774,813 | 12/56 | Livingston. | |
| 2,777,011 | 1/57 | Marks | 178—6.5 |
| 2,877,376 | 3/59 | Orthuber. | |
| 3,005,196 | 10/61 | Aiken | 343—7.9 |
| 3,041,490 | 6/62 | Rajchman et al. | 250—213 X |
| 3,083,262 | 3/63 | Hanlet | 250—213 X |

OTHER REFERENCES

"Crystal Ball Plots 3–D Curves in Color," by J. R. Alburger, Electronic Industries and Tele-Tech, February 1957. Pages 50–53 relied upon.

CHESTER L. JUSTUS, *Primary Examiner.*